United States Patent
Gärtner

(10) Patent No.: US 8,326,491 B2
(45) Date of Patent: Dec. 4, 2012

(54) METHOD AND DEVICE FOR DETERMINING AN ABSOLUTE VALUE OF A VARIABLE

(75) Inventor: Michael Gärtner, Kriftel (DE)

(73) Assignee: Continental Teves AG & Co. oHG (DE)

( * ) Notice: Subject to any disclaimer, the term of this patent is extended or adjusted under 35 U.S.C. 154(b) by 797 days.

(21) Appl. No.: 12/295,988

(22) PCT Filed: Apr. 5, 2007

(86) PCT No.: PCT/EP2007/053406
§ 371 (c)(1),
(2), (4) Date: Jul. 29, 2009

(87) PCT Pub. No.: WO2007/113332
PCT Pub. Date: Oct. 11, 2007

(65) Prior Publication Data
US 2010/0030428 A1 Feb. 4, 2010

(30) Foreign Application Priority Data
Apr. 6, 2006 (DE) .......... 10 2006 016 225
Apr. 5, 2007 (DE) .......... 10 2007 016 829

(51) Int. Cl.
*A01B 69/00* (2006.01)
(52) U.S. Cl. .......... 701/42; 701/41; 701/43; 701/70; 701/72; 180/400; 180/443; 180/417; 702/94; 702/92; 702/151
(58) Field of Classification Search .......... 701/41, 701/42, 70; 180/400, 443, 417; 702/92, 702/94, 151
See application file for complete search history.

(56) References Cited

U.S. PATENT DOCUMENTS

| 5,311,432 A | 5/1994 | Momose |
| 5,787,375 A * | 7/1998 | Madau et al. .......... 701/41 |
| 2003/0212476 A1* | 11/2003 | Aanen et al. .......... 701/1 |
| 2004/0024565 A1* | 2/2004 | Yu et al. .......... 702/151 |
| 2004/0117088 A1* | 6/2004 | Dilger .......... 701/41 |
| 2006/0155454 A1* | 7/2006 | Herrmann et al. .......... 701/70 |
| 2010/0030428 A1* | 2/2010 | Gartner .......... 701/42 |

FOREIGN PATENT DOCUMENTS

| DE | 39 38 039 A1 | 5/1991 |
| DE | 692 17 540 T2 | 9/1997 |
| EP | 0 353 995 | 8/1989 |

* cited by examiner

Primary Examiner — Redhwan k Mawari
(74) Attorney, Agent, or Firm — RatnerPrestia

(57) ABSTRACT

A method and a device for acquiring a value of a defined reference point of a first variable which is measured by an incrementally measuring sensor of a motor vehicle are disclosed. The method includes the step of acquiring intermediate values of the defined reference point in at least two detection modules using at least one second measured variable, wherein each detection module is adapted to determine a value of the defined reference point of the first variable in a pre-defined driving situation. A quality level for each intermediate value is determined. The quality levels of the intermediate values are compared. The value of the defined reference point is determined from the acquired intermediate values in accordance with a result of the compared quality levels.

19 Claims, 3 Drawing Sheets

METHOD AND DEVICE FOR DETERMINING AN ABSOLUTE VALUE OF A VARIABLE

CROSS REFERENCE TO RELATED APPLICATIONS

This application is the U.S. national phase application of PCT International Application No. PCT/EP2007/053406, filed Apr. 5, 2007, which claims priority to German Patent Application No. DE102006016225.0, filed Apr. 6, 2006 and German Patent Application No. DE102007016829.4, filed Apr. 5, 2007, the contents of such applications being incorporated by reference herein in their entirety.

TECHNICAL FIELD

The invention relates to a method for acquiring a value of a defined first reference point of a first variable which is measured by means of an incrementally measuring sensor of a motor vehicle. The invention also relates to a device, suitable for carrying out the method, for acquiring a value of a defined first reference point of a first variable which is measured by means of an incrementally measuring sensor of a motor vehicle.

BACKGROUND OF THE INVENTION

Vehicle movement dynamics control systems continuously evaluate the vehicle movement dynamics state variables such as the velocity of the vehicle, the longitudinal acceleration of the vehicle, the lateral acceleration of the vehicle, the yaw angle, the yaw rate and, in particular, the steering angle. These vehicle movement dynamics state variables are sensed by sensors in the vehicle.

For reasons of cost, incremental sensors are frequently used for these purposes. Said sensors merely measure changes in the value of a variable but not the absolute value of said variable. The absolute value can be acquired by measurements of the changes in the variable relative to a permanently defined reference point. The point at which the variable assumes the value zero is usually used as such a reference point.

The incremental sensor itself cannot be used to detect the presence of the permanently defined reference point. For this reason, the sensor, or its evaluation logic, supplies a value which is referred to an undefined, randomly selected reference point and is used here as an uncentered value. This value is generally the absolute value of the variable to be measured which is present when the sensor is switched on but which is generally not known. The instantaneous uncentered value of the variable therefore actually differs from its instantaneous absolute value by the unknown absolute value which is present when the sensor is switched on.

In order to acquire the absolute value of the variable which is to be measured, the value of the defined reference point, expressed for example as a uncentered value of the variable to be measured, must firstly be acquired when a sensor which measures in a relative fashion is used. The instantaneous absolute value is then obtained from the difference between the instantaneous uncentered value and the uncentered value of the reference point.

The value of the reference point can be acquired, for example, by means of an additional sensor which outputs an index pulse if the reference point of the variable to be measured is present. The uncentered value of the variable to be measured which is sensed at the same time with the index pulse corresponds here to the value of the reference point. However, an additional sensor increases the costs for this sensor system of the vehicle and is therefore often not used. Instead, the absolute value which is present is acquired by means of an evaluation of the vehicle behavior which is based on vehicle models and which is described by the measured values of further sensors which measure in an absolute fashion. The value of the reference point can then be inferred from the absolute value which is acquired.

In known methods for determining the value of the reference point of a variable which is measured with an incremental sensor, a defined driving situation in which the vehicle behavior is evaluated by means of the further measured values is generally predefined. For example, incrementally measuring steering angle sensors are particularly frequently used. In this context, for example the uncentered value of the zero point of the steering angle which corresponds to the straight-ahead position of the steerable vehicle wheels can be acquired while straight-ahead travel is detected using other measured values, for example the measured yaw rate of the vehicle and the measured lateral acceleration. The value of the zero point actually corresponds here to the uncentered steering angle value which is present during straight-ahead travel.

In known methods, the value of the reference point cannot be detected until the defined driving situation occurs. However, it often takes a relatively long time until the defined driving situation occurs for the first time. However, up to this time, it is not possible to acquire an absolute value of the variable which is to be measured and the vehicle systems which use this absolute value as an input variable are not operational, or are only operational to a limited degree.

SUMMARY OF THE INVENTION

An object of the present invention is to permit the quickest possible determination of the value of a defined reference point of a variable which is to be measured with an incremental sensor.

This object is achieved by means of a method and device for determining an absolute value of a variable, as described hereinafter.

There is provision that a method of the type mentioned above is carried out in such a way that intermediate values of the defined reference point are acquired in at least two detection modules using at least one second measured variable, wherein each detection module is adapted to the determination of the value of the defined reference point of the first variable in a predefined driving situation, a quality level is determined for each intermediate value which is acquired, the quality levels of the intermediate values which are acquired in various detection modules are compared, and the value of the defined reference point is determined from the acquired intermediate values in accordance with the result of the comparison of the quality levels.

In addition, a device of the type mentioned above is made available which comprises at least two detection modules in each of which an intermediate value of the defined reference point is acquired using at least one second measured variable, wherein each detection module is adapted to the determination of the value of the defined reference point of the first variable in a predefined driving situation, and wherein each detection module is designed to determine the quality level for the acquired intermediate value. In addition, the device comprises an arbitration device which is designed to compare the quality levels of the intermediate values which are acquired in various detection modules and to determine the value of the defined reference point from the acquired intermediate values in accordance with the result of the comparison of the quality levels.

The value of the defined reference point is, as already explained above, understood to mean the uncentered value of the defined reference point, i.e. the value which is referred to another, randomly selected reference point.

The invention relates to the idea that intermediate values of the defined reference point are acquired in at least two detection modules using at least one second measured variable, wherein each detection module is adapted to the determination of the value of the defined reference point of the first variable in a predefined driving situation. As a result, there are a plurality of intermediate values for the value of the defined reference point but they generally do not have a different precision level. For this reason, each acquired intermediate value determines a quality level and the ultimate value of the reference point of the first variable is determined by means of a comparison of the quality levels from the intermediate values.

The use of a plurality of detection modules which are each adapted to the determination of the value of the reference point of the first variable in a driving situation has the advantage that a reliable determination can be performed in a plurality of driving situations and the presence of a specific driving situation is not a precondition. As a result, a reliable result for the value of the reference point of the first variable is generally obtained very quickly after a restart of the ignition or after the start of travel.

In one embodiment of the method and of the device there is provision that the intermediate value with the highest quality level is used as the value for the defined reference point, or in that the value of the defined reference point is acquired from a combination of a plurality of intermediate values whose quality levels are higher than the quality level of further intermediate values and differ from one another by less than a predefined difference.

This ensures that the intermediate value or intermediate values with the highest quality level is/are used for the determination of the ultimate value of the defined reference point, as a result of which a particularly reliable value for the reference point is obtained. The intermediate values can be combined, for example, by forming mean values, minimum values or maximum values.

Furthermore, it has been found that different precision levels of the intermediate values which are acquired in the individual detection modules should be expected depending on the way in which the value of the defined reference point of the first variable is determined.

One development of the method and of the device is characterized in that each detection module is assigned a ranking corresponding to an expected level of precision of the intermediate value which is acquired in the detection module, and in that the intermediate value which has been acquired with a relatively high ranking in the detection module is used as the value for the defined reference point if intermediate values which are acquired in a plurality of detection modules have corresponding quality levels.

This ensures that when there is a corresponding quality level of two intermediate values that intermediate value for which the higher precision level is to be expected, due to the way in which it is determined, is selected.

One refinement of the method and of the device provides that for the determination of the quality levels, checking is carried out for the presence of one or more driving conditions from a set of predefined driving conditions, wherein the presence of each of the predefined driving conditions leads to a lower precision level of the intermediate values.

In this embodiment the determination of the quality levels of the intermediate values advantageously takes into account whether driving conditions which have an adverse influence on the precision of the intermediate values have been present during the determination of the intermediate values so that this can be taken into account in the decision as to which intermediate values are to be taken into account in the determination of the reference point of the first variable. This makes it possible to ensure that only the intermediate values which have been determined under "good conditions", and therefore have a high precision level, are taken into account.

In addition, one embodiment of the method and of the device provides that the intermediate values in the detection modules are determined from two or more successively acquired individual values, wherein the driving conditions from the set of predefined driving conditions which were present when a first individual value was acquired are stored, and the second individual value is subsequently acquired only if no additional driving conditions from the set of driving conditions is present.

In this embodiment it is advantageously provided that after an individual value which is used to determine the intermediate value has been sensed, individual values can be sensed only if the driving conditions do not become worse. This ensures that the precision of the intermediate values increases over time. The intermediate values can be determined here, for example, as mean values of the individual values.

One refinement of the method and of the device comprises the fact that the set of predefined driving conditions comprises a plurality of the following driving conditions: the velocity of the vehicle is lower than a predefined limiting value, the angle of lateral inclination of the vehicle is greater than a predefined threshold value, a vehicle movement dynamics control system of the vehicle carries out a control intervention for influencing the driving behavior.

The abovementioned driving conditions generally lead to a lower precision level of an intermediate value of the reference point of the first vehicle variable. In particular, when a vehicle movement dynamics control system intervenes, it can be assumed that an unstable driving state which is to be stabilized by means of the control system is present. The control interventions can be, for example, brake interventions or engine interventions or interventions into the steering system of the vehicle.

As already explained above, sensors which measure in a relative fashion in motor vehicles are used particularly frequently to measure the steering angle at the steerable wheels of the vehicle or at a steering wheel of the vehicle.

In one embodiment of the method and of the device there is provision that the first variable is a steering angle which represents the rotational angle of a steering wheel of the vehicle, and in that the defined reference point corresponds to the straight-ahead position of the steering wheel.

A further embodiment of the method and of the device provides that a first detection module is provided which is adapted to a determination of the value of the defined reference point of the first variable during cornering.

Travel through a bend is a driving situation which occurs very frequently. The abovementioned embodiment therefore advantageously provides that a detection module is provided which serves to determine the value of the defined reference point of the first variable during cornering.

One development of the method and of the device is characterized in that in the first detection module, the intermediate value is determined from a difference between an absolute value of the first variable, which is calculated in a vehicle model using at least one measured absolute value of a second variable, and a current value of the first variable.

One embodiment of the method and of the device is characterized in that a second detection module is provided which is adapted to a determination of the value of the defined reference point of the first variable during slalom travel and/or during travel on a poor underlying surface, wherein the intermediate value for the defined reference point which is acquired in the second detection module corresponds to a value of the first variable which is present when the sign of a measured yaw rate of the vehicle changes.

In particular, slalom travel is a regularly occurring driving situation which makes it possible to acquire the value of the defined reference point of the first variable in a way which is independent of the determination during cornering. For this reason, in this embodiment, a second detection module which is adapted to a determination of the value of the defined reference point of the first variable during slalom travel and/or during travel on a poor underlying surface is advantageously provided.

It has been found that the value of the reference point of the first variable during slalom travel and/or travel on a poor underlying surface can generally be determined more precisely than during cornering.

For this reason, one embodiment of the method and of the device provides that the second detection module is assigned a higher ranking than the first detection module.

Furthermore, one development of the method and of the device comprises the fact that a third detection module is provided which is adapted to a determination of the value of the defined reference point of the first variable during straight-ahead travel, wherein the intermediate value of the defined reference point corresponds to a value of the first variable which is present while straight-ahead travel is detected.

Straight-ahead travel likewise involves generally occurring driving situations which permit the value of the defined reference point of the first variable to be determined in a different way which is independent of the previously described determination processes during cornering and slalom travel or travel on a poor underlying surface.

Straight-ahead travel is a permanently defined driving state whose presence can be detected with a high level of reliability and precision by means of the sensors which are provided in the vehicle. This leads to particularly precise results for the value of the defined reference point of the first variable.

For this reason, one embodiment of the method and of the device is characterized in that the third detection module is allocated a higher ranking than the second detection module.

In one refinement of the method and of the device there is provision that each intermediate value is assigned an uncertainty level which corresponds to an estimate of the error in the intermediate value, and in that a level of uncertainty of the value of the reference point is determined from the uncertainty levels of the intermediate values which are used to determine the value of the reference point.

In this embodiment, an estimate of the errors in the acquired intermediate values is advantageously performed. In addition, an error in the value of the reference point is acquired from the estimation of the error in the intermediate values. This makes it possible to use the value of the reference point even at an early time. Although said value is then generally subject to a relatively large error, this error can be taken into account during use.

In addition, one refinement of the method and of the device provides that the value of the reference point is used to acquire an absolute value of the first variable, wherein the absolute value is used in a vehicle movement dynamics control system.

One development of the method and of the device is additionally characterized by the fact that the uncertainty level of the value of the reference point is taken into account in use of the absolute value.

The uncertainty of the value of the reference point can be used here in particular to adapt entry thresholds of a vehicle movement dynamics control system, with the result that incorrect control does not occur despite a relatively high uncertainty level of the absolute value of the first variable.

Furthermore, a computer program product is made available which has a computer program which comprises instructions for carrying out a method for determining an absolute value of a variable by means of a computing unit.

The method, according to aspects of the invention, is based on the fact that the value of the defined reference point of the first variable is determined in independent detection modules. The detection runs in the different detection modules essentially simultaneously, with the result that the detection module which is best suited for the current driving situation can always be used for acquiring the steering angle. If a plurality of results are available, a decision logic is used to ascertain which intermediate value is used by which detection module, on the basis of its quality level, for the determination of the value of the defined reference point of the first variable. Each detection module monitors and independently stores the conditions under which detection has taken place. Furthermore, the individual detection modules are placed from the outset in a ranking which reflects the precision of the results which are to be typically expected. This ranking of the detection modules forms, together with the associated quality level, the basis for the decision as to which partial result is ultimately to be used to determine the value of the defined reference point of the first variable.

In addition, an uncertainty level is introduced which is also estimated directly in the individual detection modules. The uncertainty level is a quantitative indication of the possible error in the value of the reference point of the first variable which has been determined on the basis of these detection modules. This error corresponds to the possible error in an absolute value of the first variable. This error can be used for correspondingly performing adaptations, such as for example adaptations of threshold values, in the vehicle movement dynamics control system which uses the absolute value of the first variable as an input signal. In this way, an absolute value can already be used significantly earlier in a vehicle movement dynamics control system without there being a risk of incorrect control occurring.

The aforesaid advantages, particular features and expedient developments of the invention, as well as further ones, will also become clear with reference to the figures of the described exemplary embodiments of the invention.

BRIEF DESCRIPTION OF THE FIGURES

An exemplary embodiment of the invention is illustrated schematically in the figures. Of said figures.

DETAILED DESCRIPTION OF AN EXEMPLARY EMBODIMENT

The text below is an exemplary description of how the invention can be used to determine the absolute value of a steering angle which is measured by means of a steering angle sensor which measures in a relative fashion.

Figure 1:
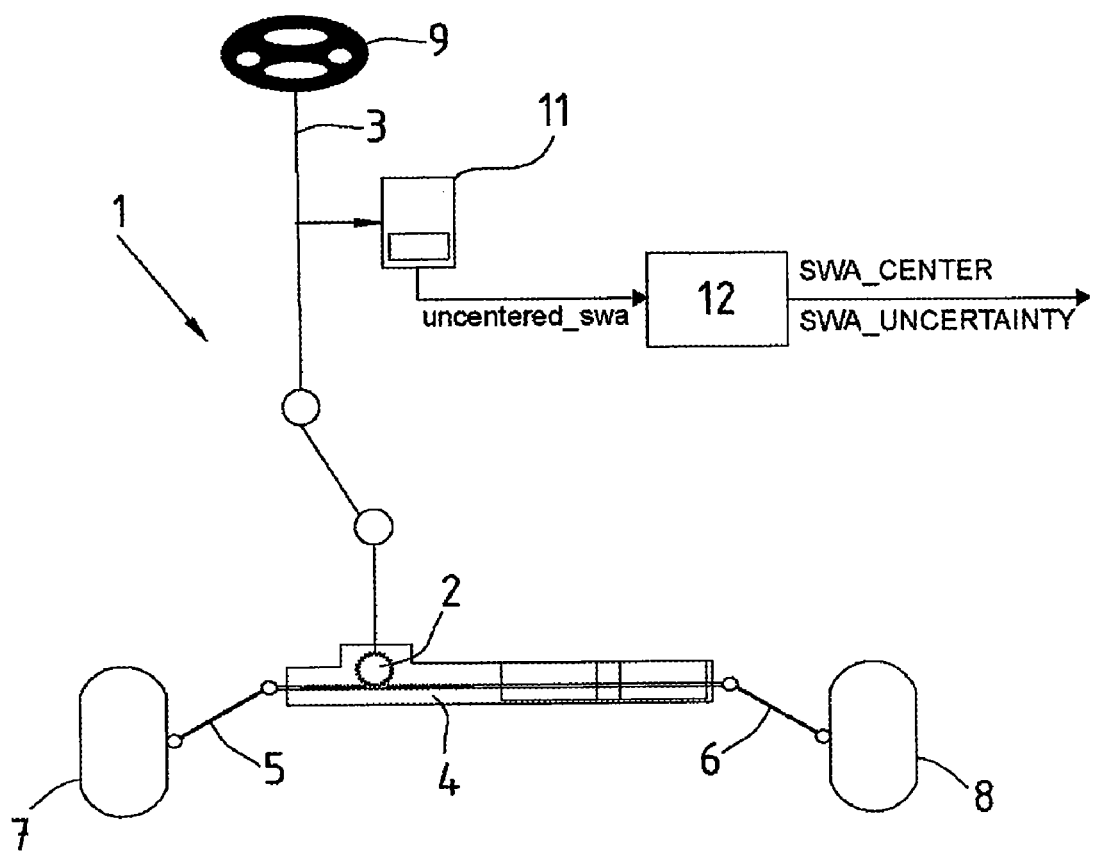
FIG. 1 is a schematic illustration of the steering system of a vehicle with an angle signal transmitter which measures in a relative fashion.

FIG. 1 illustrates a steering system of a vehicle which is provided in its entirety with the reference number 1. In the refinement which is illustrated by way of example, the steering system 1 is embodied as a toothed rack steering system in which a pinion 2, which is provided on the steering shaft 3, engages in a toothed rack 4 which activates steering links 5, 6 which are attached to the side of the toothed rack 4. The steering links 5, 6 pivot vehicle wheels 7, 8. However, within the scope of the invention other steering systems which are known to a person skilled in the art can, of course, also be used.

A steering wheel 9 is connected to the steering shaft 3 directly or via a further shaft, the angular position of the steering shaft 3 corresponding to the angular position of the steering wheel 9 here. By general convention, the straight-ahead position of the steering wheel 9 or of the steering shaft 3, i.e. the position in which the vehicle wheels 7, 8 are oriented parallel to the longitudinal axis of the vehicle, corresponds to a steering wheel angle of 0°. When the steering wheel 9 is rotated in the clockwise direction, the steering wheel angle becomes smaller, and when it is rotated in the counterclockwise direction it becomes larger. The steering wheel 9 or the steering shaft 3 can usually be rotated in an angular range from −720° to +720°, i.e. the steering angle 9 can be rotated through two full revolutions in the clockwise direction and two full revolutions in the counterclockwise direction starting from the straight-ahead position.

An incrementally measuring angle signal transmitter 11 is arranged on the steering shaft 3 and it can be used to measure the angular position of the steering shaft 3 or of the steering wheel 9 and is embodied, for example, as an optical or magnetic angle signal transmitter. In the angle signal transmitter 10, an annular, incremental track which is attached to the steering shaft 3 and which has a regular structure is sensed by means of an incremental sensor.

The angle signal transmitter 11 or an evaluation unit (not illustrated in the figures) which is assigned to the angle signal transmitter supplies, as output signal, a steering angle value which has been determined on the basis of a reference point and which is present when the angle signal transmitter 11 is switched on. This steering angle is denoted below as the uncentered signal angle (uncentered_swa). The steering angle which is present at the straight-ahead position of the steerable wheels 7, 8 or of the steering wheel generally has, expressed in the form of an uncentered steering angle, a value which is different from zero and which is referred to below as the zero point value. The zero point value is in fact the difference between the uncentered steering angle and the actual steering angle which is also referred to below as the centered steering angle. If, for example, an absolute value of the steering angle of 30° is present when the angle signal transmitter 11 is switched on, the zero point has the uncentered value −30°.

The angle signal transmitter 11 is coupled in a signal-transmitting fashion to an evaluation unit 12. The latter acquires an uncentered value of the zero point of the steering angle (SWA_CENTER) which can then be used to determine the absolute value of the steering angle. In the embodiment of the invention illustrated in FIG. 1, the uncentered value of the zero point is the output signal of the evaluation unit 12. Said output signal is then transmitted, together with the signal which has been output by the angle signal transmitter 11, to the vehicle systems which utilize the steering angle signal. These systems then determine the absolute value of the steering angle from the difference between the sensor signal and the uncentered value of the zero point. In addition, in the evaluation unit 12 an uncertainty level of the zero point value is determined (SWA_UNCERTAINTY), which can be taken into account when the zero point value is used in the further vehicle systems. In further embodiments, the absolute value of the steering angle can also already be acquired in the evaluation device.

Figure 2:
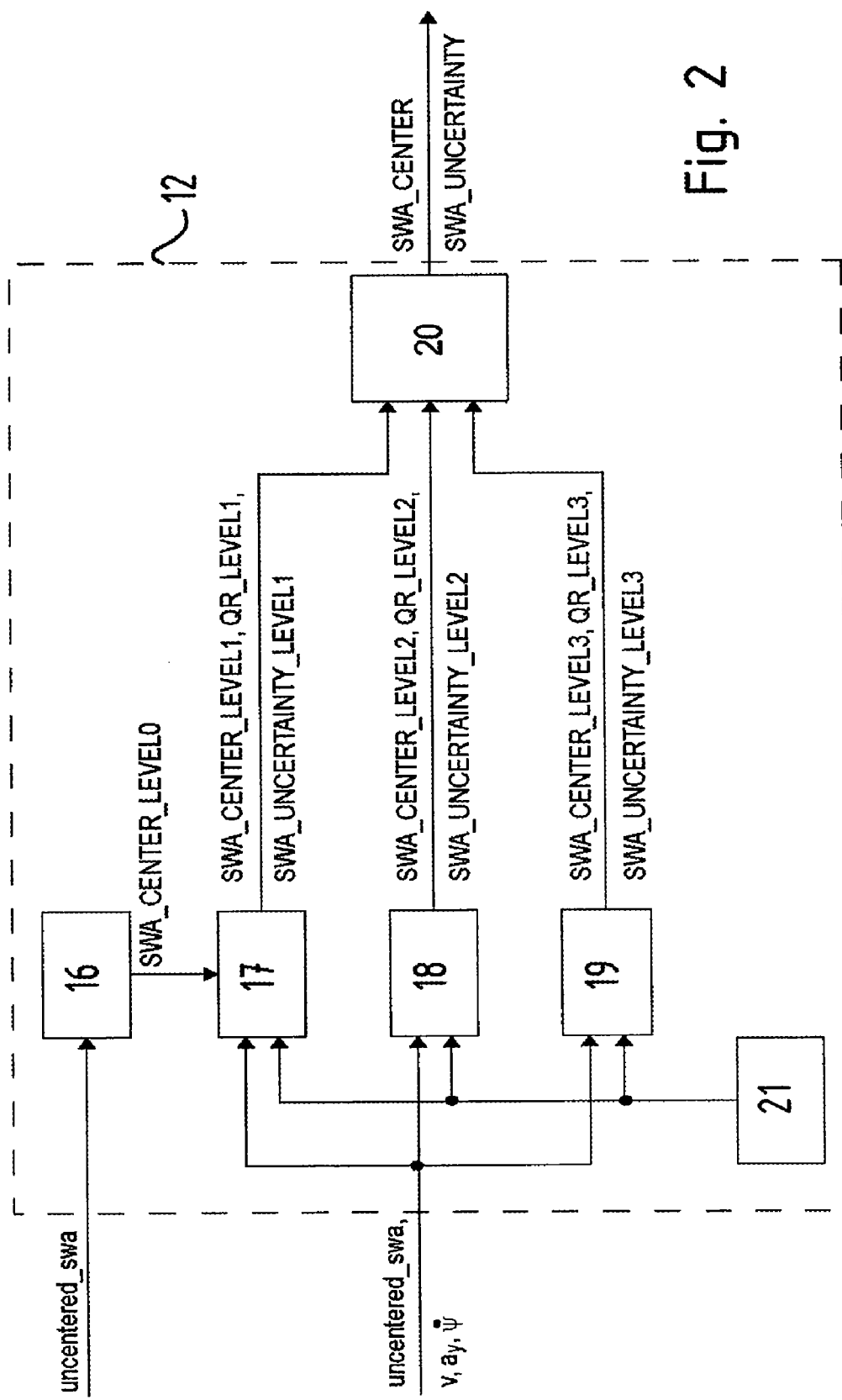
FIG. 2 is a schematic block circuit diagram of an embodiment of an evaluation unit for determining a value of a reference point of a steering angle.

The evaluation unit 12 is illustrated schematically in FIG. 2 in the form of a block diagram. In the embodiment which is illustrated by way of example, the evaluation unit comprises four detection modules 16, 17, 18, 19 which will be explained in more detail below. The detection module 16 determines a zero point value (SWA_CENTER_LEVEL0) which is then used for internal purposes in the detection modules 17, 18, 19. Each of the detection modules 17, 18, 19 continuously determines intermediate values (SWA_CENTER_LEVEL1, SWA_CENTER_LEVEL2, SWA_CENTER_LEVEL3) for the zero point value and an uncertainty level of the intermediate values (SWA_UNCERTAINTY_LEVEL1, SWA_UNCERTAINTY_LEVEL 2, SWA_UNCERTAINTY_LEVEL3). In order to acquire the intermediate values, in particular the yaw rate $\dot{\psi}$ which is measured with a yaw rate sensor, the lateral acceleration $a_y$ of the vehicle which is measured by means of a lateral acceleration sensor and the vehicle velocity v which is acquired by means of the signals of wheel speed sensors are used, which variables are also illustrated in FIG. 2 as input variables for the detection modules 17, 18, 19.

The ultimate zero point value SWA_CENTER is then acquired from the intermediate values in an arbitration device 20. To do this, in each case the quality level (QR_LEVEL1, QR_LEVEL2, QR_LEVEL3) for the determine of which in particular the driving conditions under which the intermediate values were acquired are used is assigned to the intermediate values acquired in the detection modules 17, 18, 19. The zero point value SWA_CENTER is then acquired as a function of the quality levels.

The determination of the relevant driving conditions is carried out in the situation evaluation device 21 which results are used to the detection modules 17, 18, 19 to acquire the quality levels. In this situation evaluation device 21 it is ascertained whether driving conditions which are known to have an adverse influence on the determination of the reference point of the steering angle are present. In particular it is checked whether the velocity of the vehicle is low, which is detected, for example, if a velocity of less than 10.8 kilometers per hour is identified. In addition, it is checked whether the underlying surface is inclined since when the underlying surface is inclined the driver generally steers in the direction of the rise in the underlying surface, as a result of which the straight-ahead position cannot be acquired without error. The presence of a suitable underlying surface is detected if the angle of inclination of the vehicle exceeds a predefined value of, for example, 10°. In addition it is checked whether a braking intervention is carried out by a vehicle movement dynamics controller, for example a brake slip controller or traction controller or a vehicle movement dynamics control operation since such braking interventions indicate an unstable driving situation in which likewise it cannot be ensured that error free identification of the straight-ahead position will occur. Likewise, it is also possible to check whether an intervention by a vehicle movement dynamics control system into the control of the traction engine takes place, which also indicates an unstable driving situation.

Each of the abovementioned driving conditions is assigned a flag which is set (i.e. assumes the value "true") if the driving condition is present. The flags are also referred to below as situation evaluation flags and they are used to determine the quality level in the detection modules 17, 18, 19. Wherever an improvement or worsening of the driving conditions is mentioned below, this is to be understood as meaning that a situation evaluation flag which has been set is canceled or that a further situation evaluation flag is set.

The various detection modules 16, 17, 18, 19 will be described in detail below. The detection modules 16, 17, 18, 19 are preferably software modules which are executed on a microprocessor in a control unit of the motor vehicle. The detection modules operate (with the exception of detection module 16) in a clocked fashion with clock cycles of a predetermined duration, said cycles also being referred to as loops below.

The detection modules 16, 17, 18, 19 are each assigned a ranking by means of which a ranking order corresponding to the expected precision level of the partial results acquired in the detection modules 16, 17, 18, 19 is defined.

Stationary State (Level 0)

The detection module 16, to which the ranking 0 is assigned, acquires a zero point value for the steering angle in the stationary state of the vehicle directly after a restart of the ignition. The straight-ahead position cannot be detected in the stationary state of the vehicle. For this reason there is provision for the (centered) steering angle which was present at the end of the preceding ignition cycle to be used in the detection module 16 to determine the zero point value SWA_CENTER_LEVEL0. In particular, the zero point value SWA_CENTER_LEVEL0 is obtained here as a negative value of this steering angle. However, the zero point value SWA_CENTER_LEVEL0 corresponds to the actual zero point value only if the steering wheel has not been rotated while the ignition was switched off. However, this is generally not the case so that the zero point value SWA_CENTER_LEVEL0 has an offset error which corresponds to the angular value by which the steering wheel has been rotated while the ignition was switched off. The zero point value SWA_CENTER_LEVEL0 is therefore only used internally as a starting value and is employed for plausibility checks on the zero point values acquired in the detection modules 17, 18, 19.

Cornering (Level 1)

The detection module 17 is embodied in such a way that it acquires zero point values during cornering. However, it is also active during straight-ahead travel because in the context of the invention straight-ahead travel is only considered to be a special case of cornering. The detection module 17 is assigned the ranking 1. Said detection module 17 typically supplies the first results for the straight-ahead position.

The detection module 17 is active when the following conditions are met:
 yaw rate and lateral acceleration signals are available and transient recovery has occurred;
 the vehicle movement dynamics control system does not carry out braking intervention for influencing the driving behavior;
 the calculated steering angle is within possible limits;
 the vehicle does not move in reverse;
 forward travel which has already been detected has not been interrupted;
 the vehicle is not unstable;
 the auxiliary sensor signals, i.e. yaw rate, lateral acceleration and wheel speeds, are available; and
 the detection in the detection module 17 has not yet been terminated.

The input conditions are checked by means of the input signals illustrated in FIG. 2 and by means of further input signals (not illustrated in FIG. 2) of the detection module 17.

The detection module 17 is active under the aforesaid conditions until either the detection module 18 or the detection module 19 has determined a zero point value with the "high" quality level or the detection module 17 itself has determined a result with the "high" quality level and the available number of samples corresponds to a determination period of 60 seconds. If no valid zero point value SWA_CENTER_LEVEL1 has been found or evaluated in the detection module 17 after the activation before reversing or a velocity of the vehicle which is lower than the previously mentioned input threshold has been detected, all the previously acquired samples are rejected. In this case, the detection module 17 is started anew if the abovementioned input conditions are met again.

In the detection module 17, a steering angle is calculated by means of a vehicle model assuming steady-state conditions. In one embodiment, a linear single-track model of the vehicle in which the steering angle δ at the wheels is calculated by means of $$\delta = \frac{l \cdot \Psi}{v} + a_y \cdot IG \quad (1)$$

is used as the basis. Here, l is the wheel base of the vehicle, ψ is the measured yaw rate, v is the velocity of the vehicle acquired from the signals of the wheel speed sensors, $a_y$ is the lateral acceleration (in the center of gravity system of the vehicle) measured by means of a sensor and IG is the intrinsic steering gradient of the vehicle. The steering angle which is calculated by means of equation 1 at the steerable vehicle wheels 7, 8 can be converted into the steering wheel angle in accordance with the (instantaneous) steering transmission ratio. In addition, by means of a correction factor calculated from the rate of change of the steering angle it is possible to take into account the fact that the yaw rate and lateral acceleration follow the set steering angle with a phase delay. The steering wheel angle which is determined in this way is also referred to below as the calculated steering angle.

In the vehicle movement dynamics control system, a set point yaw rate is known to be determined as a function of the steering angle. A further possible way of acquiring the present steering angle is therefore to change the steering angle incrementally until the calculated set point yaw rate has approximated as well as possible to the measured yaw rate. The steering wheel angle which is therefore determined can be used as an alternative to the calculated steering angle.

The zero point value is obtained in the detection module 17 from the difference between the uncentered steering angle and the calculated steering angle. In each loop, an individual zero point value of this type is calculated if the previously described conditions and the conditions described below are met. A zero point value which is acquired in a loop is referred to below as a sample.

In one embodiment of the invention, the quality level in the detection module 17 and in the detection modules 18, 19 can assume one of the three values "low", "medium" and "high"

or no quality level is defined. In the detection module 17, the quality level QR_LEVEL1 is set to "low" if fewer than three samples are present. The quality level QR_LEVEL1 is set to "medium" if at least three zero point values are present and at least one situation evaluation flag is set. The quality level QR_LEVEL1=high is present if at least three zero point values are present and a situation evaluation flag is not set. The quality level QR_LEVEL1 is updated whenever a sample is acquired if the number of samples has reached three or a situation evaluation flag is changed.

If fewer than three samples have been acquired in the detection module 17, i.e. the quality level low is present, the samples are added in a memory independently of the driving conditions, and the number of samples is acquired by means of a counter. As soon as at least the quality level "medium" is present, further samples are added in the memory only if the driving conditions have not become worse, i.e. an additional situation evaluation flag is not set in a loop. If the driving conditions improve, i.e. if one or more situation evaluation flags are canceled, the mean value of the previously present samples is additionally acquired by dividing the memory value by the counter reading. The memory is then overwritten with this mean value and the counter is set to 1. The mean value in the text which follows is considered to be a sample: the previously acquired samples are no longer taken into account. The algorithm is then continued in the described way, i.e. further samples are added in the memory and the counter is incremented at each addition until the driving conditions improve again or the determination of the zero point value in the detection module 17 is terminated.

Such an algorithm ensures that when the driving conditions improve only two "samples" are ever present: the current sample, which is assumed to be more precise, and the mean value of the previous samples. Behind this approach there is the intention that all the samples which have been taken under relatively poor conditions will support the determination of the zero point value if the conditions have actually just improved. However, they will lose their significance very quickly if further measured values are acquired under favorable conditions.

In each loop or after each acquisition of a sample, the detection module 17 acquires a zero point value SWA_CENTER_LEVEL1 in that the memory value which is then present is divided by the counter reading which is then present, and said detection module 17 transmits this value together with the associated quality level QR_LEVEL1 and the associated steering angle uncertainty level SWA_UNCERTAINTY_LEVEL1 to the arbitration device 20.

The quality level QR_LEVEL3 which is assigned to a zero point value SWA_CENTER_LEVEL3 corresponds to the quality level which was present when the last sample which is used to determine the zero point value SWA_CENTER_LEVEL3 was present.

Figure 3:
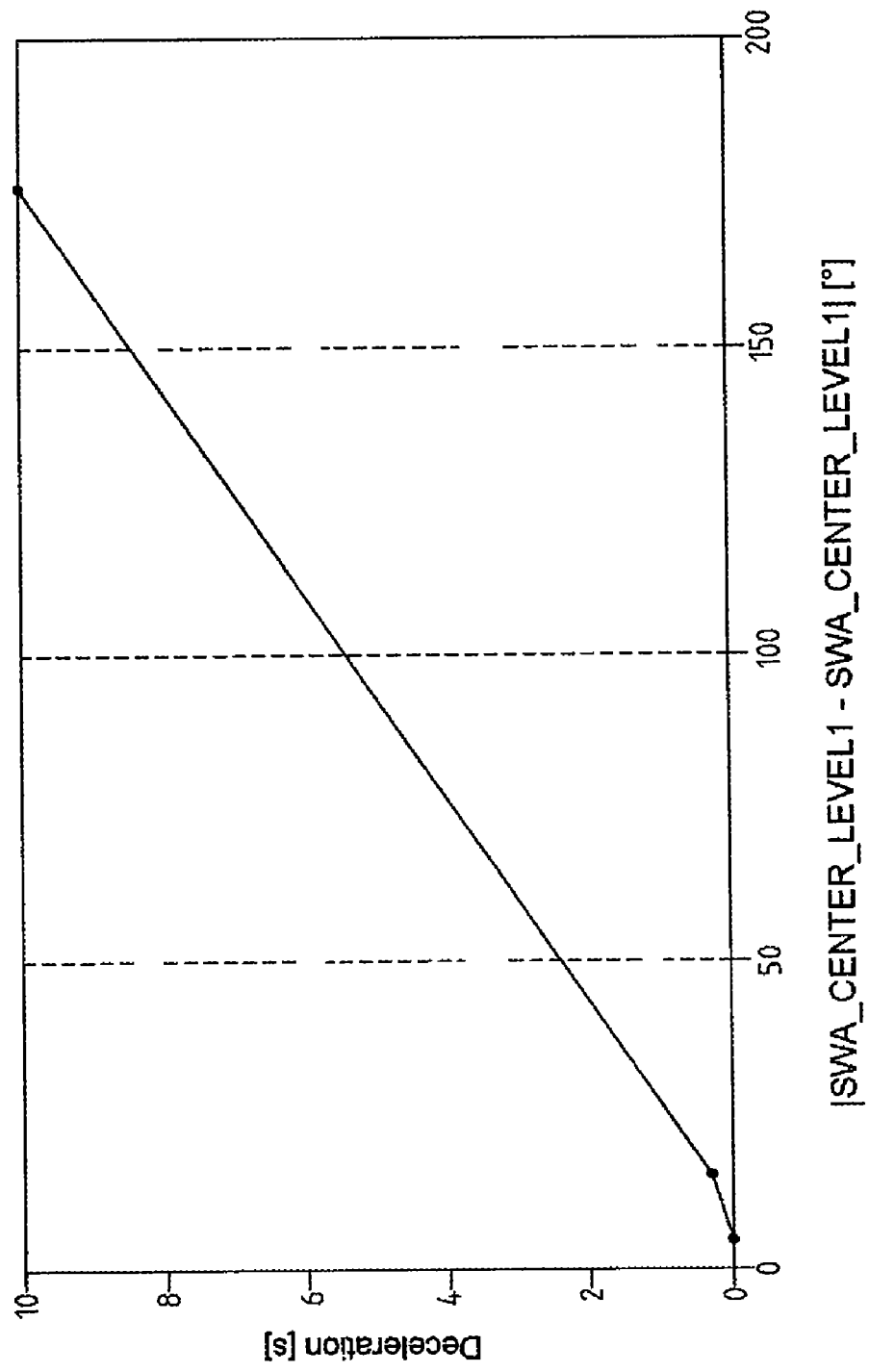
FIG. 3 is a diagram which describes a deceleration as a difference between steering angle values in schematic form.

However, depending on the driving situation, the zero point value in the detection module 17 can be very imprecise if only a few samples have been acquired. In order to avoid errored determination of the zero point value, the zero point value SWA_CENTER_LEVEL1 which was acquired in the detection module 17 is therefore compared with the zero point value SWA_CENTER_LEVEL0 which was acquired in the detection module 16. Depending on the difference between these two values, the result of the detection module 17 is considered to be reliable only with a certain delay. For this purpose, the difference is assigned a delay, which can occur, for example, by means of the characteristic curve illustrated in FIG. 3. As long as the time period corresponding to the number of acquired samples is shorter than this delay, the quality level QR_LEVEL1 is limited. If the zero point value SWA_CENTER_LEVEL1 is already valid, i.e. is used by the arbitration device 20 to determine the zero point value SWA_CENTER, the quality level QR_LEVEL1 is limited to "medium" at most. If the result is still not yet valid but the driving direction is confirmed as "forward", the quality level QR_LEVEL1 is reduced by one level compared to the level acquired in the way described above. If, in addition, forward travel has not yet been confirmed, the result is completely rejected, i.e. the result is not assigned a quality level.

Reversing which is not detected is critical for the determination of the zero point value in the detection module 17 because in this case the yaw rate has a reversed sign and the equation 1 is no longer correct. Consequently, the resulting error could be very large. For this reason, the detection module 17 preferably additionally includes a monitoring mechanism which functions in the following way: as long as a forward travel direction has not been confirmed, a flag is set. This flag is canceled only if reversing or forward travel is detected. In the case of forward travel, there is no need for particular measures. However, if reversing is detected, all the available samples are reduced to a predefined, minimum permitted number. This is done by forming the mean value of the available samples and multiplying it by the minimum permitted number. The value which is present in the memory is then overwritten by the result of the multiplication, and the counter reading is set to the minimum permitted number. The detection is then interrupted and newly started again with these memory values and counter readings if the input conditions are met again. This reduction in the number of samples is intended, on the one hand, to limit the negative influence of reversing. On the other hand, this result is not to be completely rejected.

The steering angle uncertainty of a sample which has been acquired in the detection module 17 is determined in the following way. A first estimate of the uncertainty supplied by the deviation of the sample from the zero point value SWA_CENTER_LEVEL1 which was acquired by means of the previous samples. In addition, samples which are obtained while the steering wheel is rotating quickly generally provide less precise results. The previously mentioned correction factor which is included in the calculated steering angle does not provide a second estimate for the instantaneous steering angle uncertainty for this reason. Since the influence on the detected straight-ahead position decreases as the number of samples increases, this correction factor is divided by the number of samples in order to obtain a second estimate of the steering angle uncertainty. The uncertainty of the sample is acquired by means of the maximum of the first and second estimates. The steering angle uncertainty SWA_UNCERTAINTY_LEVEL1 of a zero point value SWA_CENTER_LEVEL1 which was acquired in the detection module 17 is obtained as a mean value of the uncertainty levels of the individual samples which have been used to determine the zero point value SWA_CENTER_LEVEL1. In order to reflect the negative influence of the driving conditions, the mean value is additionally adapted with a correction factor which depends on the quality level QR_LEVEL1. Given a quality level QR_LEVEL$_1$=high, said mean value assumes, for example, the value 1.0, and given a quality level QR_LEVEL1=medium which assumes the value 1.75, and given a quality level QR_LEVEL1=low it assumes the value 2.5.

If the first samples happen to produce very similar values and the change in the steering angle is small, the steering angle uncertainty SWA_UNCERTAINTY_LEVEL1 can yield an excessively low value. For this reason, the steering angle uncertainty SWA_UNCERTAINTY_LEVEL1 is limited to a minimum value which is, for example, 0.5 degrees if only the maximum permitted number of measured values has been registered and if said number drops linearly to the value zero when the next 20 samples are acquired.

Slalom Travel or Travel on a Poor Underlying Surface (Level 2)

The detection module 18 is configured to detect the straight-ahead position of the steering angle from zero crossovers of the yaw rate, such as occur on poor roads or in the case of slalom driving owing to steering movements of the driver. In this context it is assumed that the so-called dynamics steering angle which is present at such a zero crossover corresponds to the straight-ahead position of the steering wheel. The dynamic steering angle results from filtering of the uncentered steering angle. Through suitable configuration and application of a low-pass filter, the delayed reaction of the vehicle to steering movements is compensated for here. The detection module 18 is assigned the ranking 2. Said detection module 18 can supply results quickly for the zero point value but the detection is restricted to specific driving situations.

The detection module 18 is active if the following conditions are met:
the yaw rate and lateral acceleration signals are available and transient recovery has occurred;
the velocity of the vehicle is higher than 5 km/h;
no reversing movement is detected;
the vehicle is not unstable;
sensor signals for the yaw rate, lateral acceleration and wheel speeds are available; and
the detection at level 2 has not yet been terminated.

The input conditions are checked by means of the input signals illustrated in FIG. 2 and by means of further input signals of the detection module 18 which are not illustrated in FIG. 2.

The detection module 18 remains active under the aforesaid conditions until the detection module 19 has detected a zero point value with the quality level QR_LEVEL3=high or until the detection module 18 itself has determined a zero point value with the quality level QR_LEVEL2=high and at least 20 samples have been recorded. If no valid zero point value SWA_CENTER_LEVEL2 has been found or output in the detection module 18 after the activation before reversing or a velocity of the vehicle which is lower than the previously mentioned entry threshold has been detected, all the previously acquired samples are rejected. In this case, the detection module 18 is started anew when the abovementioned input conditions are met again.

As already mentioned, the value of the dynamics steering angle which is present at a zero crossover of the yaw rate corresponds at least approximately to the straight-ahead position of the steering wheel. At each zero crossover of the yaw rate signal a sample is produced if the conditions which are predefined for the acquisition of the samples are met. In order to avoid multiple detection at an actual single zero crossover, a delay of, for example, 0.2 seconds between each acquisition of measurements is provided. Furthermore, the direction of the zero crossover must be different for two successive samples.

In complete accordance with what has been described above in relation to detection modules 17, the first two samples are added in a memory independently of the driving conditions and the number of samples is acquired by means of a counter. If two samples are already present, further samples are added in the memory only if the driving conditions do not become worse, i.e. no additional situation evaluation flag is set. If the driving conditions improve, i.e. if one or more situation evaluation flags are canceled, the mean value of the samples up to then is additionally acquired by dividing the memory value by the counter reading. The memory is then overwritten with this mean value and the counter is set to 1. The algorithm is then continued in the described fashion, i.e. further samples are added in the memory and the counter is incremented at each addition until the driving conditions improve anew or the determination of the zero point value in the detection module 17 is terminated.

In each loop or after each acquisition of a sample, the detection module 18 acquires a zero point value SWA_CENTER_LEVEL2 by dividing the memory value which is present then by the counter reading which is present then. The zero point values SWA_CENTER_LEVEL2 are transported, together with the associated quality level QR_LEVEL2 and the associated steering angle uncertainty SWA_UNCERTAINTY_LEVEL2, to the arbitration device 20.

The quality level QR_LEVEL2 for the detection module 18 depends, as for all other detection modules, on the conditions under which the samples have been acquired. For a quality rating which is better than "low", at least two samples are necessary. In order to reach the quality level QR_LEVEL2=high, at least eight samples have to have been acquired and a situation evaluation flag must not have been set. The levels "medium" and "low" can be set, for example, by means of the following table. In the table, "true" means that the corresponding flag is set, "false" means that it is not set, and "–" means that it is irrelevant whether or not it is set.

| Velocity of vehicle low | Underlying surface inclined | Braking intervention | Engine intervention | QR_LEVEL2 |
|---|---|---|---|---|
| — | — | True | — | Low |
| True | True | — | — | |
| True | False | False | — | Medium |
| False | True | False | — | |
| False | False | False | True | |

In accordance with these specifications, the quality level QR_LEVEL2 is updated, if necessary, whenever a sample is acquired. The quality level QR_LEVEL2 which is assigned to a zero point value SWA_CENTER_LEVEL2 corresponds to the quality level which was present when the last sample was acquired and which is used to determine the zero point value SWA_CENTER_LEVEL2.

The steering angle uncertainty of a sample is determined in the detection module 18 in a similar way to that in the detection module 17. A first estimate of the steering angle uncertainty of a sample is obtained in turn from the difference between the sample and the zero point value acquired by means of the previous samples. Since the results become more imprecise in the case of very dynamic driving maneuvers, the difference between an uncentered steering angle and the dynamics steering angle can be used as a second estimate of the uncertainty. Trust in the calculated straight-ahead position increases with more wide ranging detection. For this reason, this value for the steering angle uncertainty is divided by the number of samples. It has not proven necessary to limit the steering angle uncertainty. The steering angle uncertainty SWA_UNCERTAINTY_LEVEL2 of a zero point value SWA_CENTER_LEVEL2 is obtained from the mean value of the uncertainties of the samples used to determine the zero point value SWA_CENTER_LEVEL2, corrected by means of a correction factor. Given a quality level QR_LEVEL2=high, the correction factor assumes, for example, the value 1.0, given a quality level QR_LEVEL2=medium it is assumes the value 1.5, and given a quality level QR_LEVEL2=low it assumes the value 2.0.

Straight-Ahead Travel (Level 3)

The detection module 19 is designed to determine the zero point value during straight-ahead travel. Here, the uncentered steering angle during detected straight-ahead travel corresponds to the straight-ahead position of the steering wheel. The detection module 19 is assigned the ranking 3. The detection is preferably not as fast as in the detection modules with the lower levels; however, the detection module 19 generates very precise results for the zero point level.

The detection module 19 is active if the following conditions are met:
  yaw rate and lateral acceleration signals are available and transient recovery has occurred;
  the velocity of the vehicle is higher than 5 km/h;
  the vehicle is not unstable;
  sensor signals are available for the yaw rate, lateral acceleration and wheel speeds; and
  the detection at level 3 is not yet terminated.

The detection module 19 is active under these conditions until they at least 20 observation cycles with the quality level QR_LEVEL3=high have been run through. Furthermore, a zero point value SWA_CENTER_LEVEL3 which has been acquired in the detection module 19 must have an uncertainty level of less than, for example, 0.0330. If a valid zero point value SWA_CENTER_LEVEL3 has not been found in the detection module 19 or output after the activation before a velocity of the vehicle which is less than the previously mentioned input threshold has been detected, all the previously acquired samples are rejected. In this case, the detection module 19 is started anew when the abovementioned input conditions are met again.

As already mentioned, the uncentered steering angle corresponds to the zero point value during detected straight-ahead travel. In order to detect straight-ahead travel it is necessary for the yaw rate and the yaw acceleration to remain within predefined limiting values during one observation cycle. In addition, the uncentered steering angle must not change significantly. In particular, the change in the uncentered steering angle must not exceed a specific threshold value.

For the first observation cycle, the limiting values for the yaw rate and the yaw acceleration are predefined as 3°/s and 9.6°/s$^2$ in one exemplary embodiment. If an observation cycle has been successfully terminated, the limiting values for the next observation cycle are reduced to those maximum values of the yaw rate and of the yaw acceleration which have been observed in the previous cycle. In this way, the limiting values become lower and the precision of the zero point values SWA_CENTER_LEVEL3 becomes better at each new observation cycle. In order to prevent a situation in which the algorithm cannot be continued because the maximum values happened to be very small in one observation cycle, the limiting values are limited to a minimum of 0.6°/s and 2.4°/s$^2$.

The limiting value for the permitted changes in steering are derived from the instantaneous limiting value of the yaw rate with a division factor of 0.5/s. That is to say if, for example, the yaw rate limit is 1.5°/s, changes in steering angle of a maximum of 3 degrees are permitted. This limit is restricted to a minimum value which corresponds to the resolution of the sensor. For example, for physical resolution values above 1.5° for the sensor the division factor is reduced to 0.3 per second.

The duration of an observation cycle depends essentially on the velocity of the vehicle. At low velocities of the vehicle, relatively long observation cycles are required. In one embodiment, an observation cycle at 5 km/h has a duration of 2.5 seconds, and as the velocity of the vehicle increases the duration decreases linearly to 0.75 seconds at 60 km/h, and is also 0.75 seconds if the velocity increases further.

If the vehicle is traveling straight ahead on a road with an incline, the driver must steer toward the relatively high side of the road in order to travel straight ahead. Normally, the steering wheel cannot be held still for a relatively long period of time in such a driving situation. In order to avoid errored results, the observation time is therefore multiplied by a correction factor which depends on the angle of inclination of the vehicle and which increases from 1.0 for 0 degrees to 4 for 45 degrees angle of inclination. If the angle of inclination changes during one observation cycle, the maximum of the acquired values is used to determine its duration.

If the yaw rate or the yaw acceleration exceeds the corresponding limiting value which is predefined for one observation cycle, the observation cycle is aborted and a new observation cycle is started.

In particular during the first observation cycles with high limiting values, the yaw rate and the yaw acceleration can remain below their limiting values even though the vehicle is actually traveling on a constant bend with a large radius. In order to avoid incorrect detections in such a case, an additional requirement is that the sign of the yaw rate changes during one observation cycle. In particular, the active observation cycle is aborted if the sign of the yaw rate is constant for at least 75% of the observation period.

During one active observation cycle, the uncentered steering angle is acquired once per loop as a sample. The acquired samples are added in a memory and a counter is incremented for each acquired sample. When an observation cycle is successfully terminated (i.e. not aborted), an intermediate zero point value is determined as the mean value of the samples acquired in the observation cycle by virtue of the fact that the memory value is divided by the counter reading. The memory and counter for the next observation cycle are then reset to the value zero. In addition, the memory and counter are also reset if an observation cycle has been aborted.

The intermediate zero point of the first observation cycle after the activation of the detection module 19 or after improvement of the driving conditions, i.e. after the resetting of a situation evaluation flag is transferred as zero point value SWA_CENTER_LEVEL3. For a subsequent observation cycle, the zero point value SWA_CENTER_LEVEL3 is calculated, 70% of the intermediate zero point value of this observation cycle and 30% of the intermediate zero point value of the preceding observation cycle being included in the zero point value SWA_CENTER_LEVEL3. The values SWA_CENTER_LEVEL3 which are acquired in this way are transferred, together with the associated quality level QR_LEVEL3 and the associated steering angle uncertainty SWA_UNCERTAINTY_LEVEL3, to the arbitration device 20.

The first observation cycle is started after the activation of the detection module 19. In accordance with what has been described for the detection module 17, 18, a further observation cycle is started only if the driving conditions do not become worse, i.e. if an additional situation evaluation flag is not set. If the driving conditions become worse during an observation cycle, the active observation cycle is interrupted until the driving conditions reach the previous level again. If the driving conditions improve during an observation cycle, above the level at the start of the observation cycle, the observation cycle is aborted and a new observation cycle is started. The limiting values for the yaw rate and the yaw acceleration are reset to output values in this case.

The quality level QR_LEVEL3 is set to "high" in the detection module 19 if a situation evaluation flag is not set. The levels "medium" and "low" can be defined, for example, by reference to the table specified in conjunction with the detection module 18. Whenever a sample is acquired, the quality level is updated if necessary. The quality level QR_LEVEL3 which is assigned to a zero point value SWA_CENTER_LEVEL3 correspond to the quality level which was present when the last observation cycle which is used to determine the zero point value SWA_CENTER_LEVEL3 was acquired.

The steering angle uncertainty SWA_UNCERTAINTY_LEVEL3 with a zero point value SWA_CENTER_LEVEL3 is derived in the detection module 19 from the maximum yaw rate which was observed during the observation cycle in which the zero point value was determined. Assuming steady-state conditions, the steering angle uncertainty can be estimated by means of $$\left(\frac{l}{v} + IG \cdot v\right) \cdot \delta\Psi$$

where the yaw rate error $\delta\psi$ is obtained from the difference between the maximum yaw rate of the aforesaid observation cycle and the previously described minimum value of the yaw rate limit. In order to prevent the steering angle uncertainty assuming large values at low velocities, a downward limit of, for example, 10 km/h is placed on the velocity of the vehicle for the calculation of the steering angle. The steering angle uncertainty is calculated here in such a way that it remains constant or decreases in the cycle following the first observation cycle. As in the other levels, the uncertainty is adapted in accordance with a quality level by means of a correction factor in the figure. Given a quality level QR_LEVEL3=high the correction factor assumes, for example, the value 1.0, given a quality level QR_LEVEL2=medium it assumes the value 1.25 and given a quality level QR_LEVEL3=low it assumes the value 1.5.

As soon as a zero point value SWA_CENTER_LEVEL1, SWA_CENTER_LEVEL2 or SWA_CENTER_LEVEL3 has been determined in a detection module 17, 18 or 19, said zero point value SWA_CENTER_LEVEL1, SWA_CENTER_LEVEL2 or SWA_CENTER_LEVEL3 is transmitted, together with the associated quality level QR_LEVEL1, QR_LEVEL2 or QR_LEVEL3 and the associated steering angle uncertainty SWA_UNCERTAINTY_LEVEL1, SWA_UNCERTAINTY_LEVEL2 or SWA_UNCERTAINTY_LEVEL3, to the arbitration device 20.

In the arbitration device 20, the valid zero point value SWA_CENTER which is to be employed for use in further vehicle systems is acquired from the available zero point values SWA_CENTER_LEVEL1, SWA_CENTER_LEVEL2 and SWA_CENTER_LEVEL3.

Basically, in one embodiment there is provision that the zero point value with the highest quality level is used as the valid zero point level SWA_CENTER. If zero point values which are acquired in two or more detection modules have the same quality level, the zero point value is set as a valid zero point value SWA_CENTER which has been determined in the detection module with the highest ranking. However, if a zero point value has been acquired in a detection module with a higher ranking, its quality level is only slightly worse than the quality level of a zero point value which has been acquired in a detection module with a lower ranking, the mean value, which value is determined in these two detection modules, is formed and is used as the value of the zero point SWA_CENTER. Given the use of three quality levels which is provided here by way of example, a slight difference is understood to be a difference of a quality level. Furthermore, it is also possible to provide that the mean value of the zero point values which have been acquired with a high quality level in two detection modules with a relatively low ranking is defined as a valid zero point level SWA_CENTER.

Taking the previously described detection modules and quality levels as a basis, the valid zero point value is determined in one embodiment in particular on the basis of the following table. In the table "–" means that the corresponding quality level is irrelevant. An entry "ranking X+Y" in the last column means that the mean value of the zero point levels acquired in the detection modules of the rankings X and Y is used as a valid zero point value.

| QR_LEVEL1 | QR_LEVEL2 | QR_LEVEL3 | SWA_CENTER |
|---|---|---|---|
| – | – | High | Ranking 3 |
| Without, medium or low | Without, medium or low | Medium | |
| Without or low | Without or low | Low | |
| – | High | Medium | Rankings 2 + 3 |
| Without, low or medium | Medium | Low | |
| High | Without, low or medium | Medium | Rankings 1 + 3 |
| Medium | Without or low | Low | |
| – | High | Without or low | Ranking 2 |
| Without, low or medium | Medium | Without | |
| High | Medium | Without or low | Rankings 1 + 2 |
| Medium | Low | Without | |
| High | Without or low | Without or low | Ranking 1 |
| Medium | Without | Without | |

The valid zero point value SWA_CENTER which is acquired in this way is used to determine the absolute or centered steering angle which is used in further systems of the vehicle, in particular for example in one or more vehicle movement dynamics control systems. The absolute steering angle is obtained here from the difference between the uncentered steering angle SWA_CENTER and the valid zero point value SWA_CENTER.

Furthermore, the arbitration device determines the uncertainty of the valid zero point value SWA_CENTER. If only one of the intermediate values SWA_CENTER_LEVEL1, SWA_CENTER_LEVEL2, SWA_CENTER_LEVEL3 is used to determine the zero point value SWA_CENTER, its steering angle uncertainty is transferred for the zero point value SWA_CENTER. If a plurality of intermediate values SWA_CENTER_LEVEL1, SWA_CENTER_LEVEL2, SWA_CENTER_LEVEL3 is used to determine the zero point value SWA_CENTER, the maximum value of the steering uncertainties which are assigned to the intermediate values employed are transferred as the steering angle uncertainty of the zero point value SWA_CENTER.

When the absolute steering angle is used in the vehicle systems, the steering uncertainty is also advantageously included if a malfunction of the system can result from an errored absolute steering angle. If the system is, for example, a control system which is active when one of the steering angles or a variable which is calculated from the steering angle exceeds or drops below a predefined threshold value, the threshold value can be adapted by means of the steering angle uncertainty or a variable which is calculated from the steering angle uncertainty. As a result, even early absolute values which are subject to a relatively high degree of uncertainty can be used without the vehicle systems malfunctioning.

Of course, the previous description of exemplary embodiments is to be understood as purely exemplary and the invention can basically be carried out in other ways. In particular, it is possible to provide, for example, that more than four detection modules are provided so that further driving situations can be covered. In addition, more than three quality levels can be used for finer resolution evaluation of the intermediate values.

Furthermore, the invention is not restricted to acquiring a zero point value of a steering angle but rather can also be used in a similar way to determine zero point values or values of other defined reference points of a further variable.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for acquiring a value of a defined reference point of a first variable which is measured by an incrementally measuring sensor of a motor vehicle, said method being performed by a processor of the motor vehicle and comprising the steps of:
    (a) acquiring, by the processor, intermediate values of the defined reference point in at least two detection modules using at least one second measured variable, wherein each detection module has a predefined ranking and is adapted to determine a value of the defined reference point of the first variable in a respective pre-defined driving situation,
    (b) determining, by the processor, a quality level for each intermediate value based on driving conditions,
    (c) comparing, by the processor, the quality levels of the intermediate values, and
    (d) determining, by the processor, the value of the defined reference point from the acquired intermediate values based on the comparison of the quality levels and the ranking of the detection modules.

2. The method as claimed in claim 1, wherein step (d) comprises the sub-step of determining the value of the defined reference point from the intermediate value of the highest quality level.

3. The method as claimed in claim 1, wherein step (d) comprises the sub-step of determining the value of the defined reference point from a combination of a plurality of intermediate values whose quality levels are higher than the quality level of further intermediate values and differ from one another by less than a predefined difference.

4. The method as claimed in claim 1 further comprising the steps of:
    assigning each detection module a ranking corresponding to an expected level of precision of the intermediate value which is acquired in the detection module; and
    using the acquired intermediate value with a relatively high ranking in the detection module as the value for the defined reference point if intermediate values which are acquired in a plurality of detection modules have corresponding quality levels.

5. The method as claimed in claim 1, wherein step (b) comprises the sub-step of checking for the presence of one or more driving conditions from a set of predefined driving conditions, wherein the presence of each of the predefined driving conditions leads to a lower precision level of the intermediate values.

6. The method as claimed in claim 5, wherein step (b) comprises the sub-step of determining the intermediate values in the detection modules from two or more successively acquired individual values, wherein the driving conditions from the set of predefined driving conditions which were present when a first individual value was acquired are stored, and a second individual value is subsequently acquired only if no additional driving conditions from the set of driving conditions is present.

7. The method as claimed in claim 5, wherein the set of predefined driving conditions comprises a plurality of the following driving conditions:
    a velocity of the vehicle is lower than a predefined limiting value,
    an angle of lateral inclination of the vehicle is greater than a predefined threshold value, and
    a vehicle movement dynamics control system of the vehicle carries out a control intervention for influencing driving behavior.

8. The method as claimed in claim 1, wherein the first variable is a steering angle which represents a rotational angle of a steering wheel of the vehicle, and the defined reference point corresponds to a straight-ahead position of the steering wheel.

9. The method as claimed in claim 1 further comprising the step of providing a first detection module which is adapted to determine the value of the defined reference point of the first variable during a cornering movement of the vehicle.

10. The method as claimed in claim 1, wherein step (a) comprises the sub-step of determining an intermediate value in the first detection module from a difference between an absolute value of the first variable, which is calculated in a vehicle model using at least one measured absolute value of a second variable, and a current value of the first variable.

11. The method as claimed in claim 1, step (a) comprises the sub-step of determining an intermediate value in the second detection module from the defined reference point of the first variable during (i) slalom travel, (ii) travel on a poor underlying surface, or a combination of (i) and (ii),
    wherein the intermediate value for the defined reference point that is acquired in the second detection module corresponds to a value of the first variable which is present when a sign of a measured yaw rate of the vehicle changes.

12. The method as claimed in claim 11, further comprising the step of assigning a higher ranking to the second detection module than to the first detection module.

13. The method as claimed in claim 1 further comprising the step of providing a third detection module that is adapted to determine the value of the defined reference point of the first variable during straight-ahead travel of the vehicle,
    wherein the intermediate value of the defined reference point corresponds to a value of the first variable which is present while straight-ahead travel of the vehicle is detected.

14. The method as claimed in claim 13 further comprising the step of allocating a higher ranking to the third detection module than the second detection module.

15. The method as claimed in claim 1 further comprising the steps of:
  assigning an uncertainty level to each intermediate value which corresponds to an estimate of an error in the respective intermediate value, and
  determining a level of uncertainty of the value of the reference point from the uncertainty levels of the intermediate values that are used to determine the value of the reference point.

16. The method as claimed in claim 1 further comprising the steps of:
  acquiring an absolute value of the first variable from the value of the reference point, and
  using the absolute value in a vehicle movement dynamics control system.

17. The method as claimed in claim 16 further comprising the step of accounting for an uncertainty level of the value of the reference point in the step of using the absolute value.

18. A computer program product which has a computer program which comprises instructions for the execution of a method as claimed in claim 1 by a computing unit.

19. A device for acquiring a value of a defined reference point of a first variable which is measured by an incrementally measuring sensor of a motor vehicle, said device comprising:
  at least two detection modules having a respective predefined ranking that are each configured to:
    (i) acquire an intermediate value of the defined reference point using at least one second measured variable,
    (ii) determine the value of the defined reference point of the first variable in a predefined driving situation of the vehicle, and
    (iii) determine a quality level for the acquired intermediate value based on driving conditions; and
  an arbitration device that is configured to compare the quality levels of the intermediate values and determine the value of the defined reference point from the acquired intermediate values based upon a result of the comparison of the quality levels and the ranking of the detection modules.

* * * * *